United States Patent
Knauff

(10) Patent No.: US 7,339,295 B2
(45) Date of Patent: Mar. 4, 2008

(54) ELECTRIC MACHINE WITH IMPROVED TEMPERATURE MONITORING SYSTEM

(75) Inventor: Axel Knauff, Münnerstadt (DE)

(73) Assignee: Siemens Aktiengesellschaft, München (DE)

( * ) Notice: Subject to any disclaimer, the term of this patent is extended or adjusted under 35 U.S.C. 154(b) by 171 days.

(21) Appl. No.: 10/775,816

(22) Filed: Feb. 10, 2004

(65) Prior Publication Data

US 2006/0017336 A1 Jan. 26, 2006

(30) Foreign Application Priority Data

Feb. 10, 2003 (DE) ................................ 103 05 368

(51) Int. Cl.
*H02K 11/00* (2006.01)

(52) U.S. Cl. .................. 310/68 C; 310/68 R
(58) Field of Classification Search ............. 310/68 R, 310/68 C, 90, 254, 261
See application file for complete search history.

(56) References Cited

U.S. PATENT DOCUMENTS

| 4,827,487 | A | * | 5/1989 | Twerdochlib | ............... 374/152 |
| 4,914,329 | A | * | 4/1990 | Ottersbach | ................ 310/68 C |
| 5,917,428 | A | * | 6/1999 | Discenzo et al. | ...... 340/870.01 |
| 6,346,810 | B2 | * | 2/2002 | Cho et al. | ................. 324/244.1 |
| 6,529,135 | B1 | * | 3/2003 | Bowers et al. | .............. 340/648 |
| 6,548,981 | B1 | * | 4/2003 | Ishii et al. | ................... 318/538 |
| 6,611,078 | B1 | * | 8/2003 | Durham et al. | ............. 310/254 |
| 6,894,484 | B2 | * | 5/2005 | Takizawa et al. | ........... 324/174 |
| 6,903,525 | B2 | * | 6/2005 | Carson et al. | .............. 318/432 |
| 6,984,915 | B2 | * | 1/2006 | Galyean | ..................... 310/232 |
| 2002/0079762 | A1 | * | 6/2002 | Fukuda et al. | ................ 310/81 |
| 2003/0006655 | A1 | * | 1/2003 | Zhang | ......................... 310/52 |
| 2003/0020342 | A1 | * | 1/2003 | Takeuchi | .................. 310/68 B |

FOREIGN PATENT DOCUMENTS

| DE | 2 242 243 | 3/1974 |
| DE | 222 116 | 5/1985 |

* cited by examiner

*Primary Examiner*—Thanh Lam
(74) *Attorney, Agent, or Firm*—Henry M. Feiereisen; Ursula B. Day

(57) ABSTRACT

An electric machine includes a heat-generating machine component, and a temperature radiation detector for contactless determination and/or measurement of heat radiating from the machine component for ascertaining an absolute and current temperature of the machine component. In this way, the electric machine can be operated at maximum power, without experience overheating.

12 Claims, 3 Drawing Sheets

ELECTRIC MACHINE WITH IMPROVED TEMPERATURE MONITORING SYSTEM

CROSS-REFERENCES TO RELATED APPLICATIONS

This application claims the priority of German Patent Application, Serial No. 103 05 368.9, filed Feb. 10, 2003, pursuant to 35 U.S.C. 119(a)-(d), the disclosure of which is incorporated herein by reference.

BACKGROUND OF THE INVENTION

The present invention relates, in general, to the field of electric machines.

An electric machine can be operated at maximum power only when the temperature of various heat-producing machine components is monitored. Examples of heat-generating components include stator, rotor, winding, or bearing units. A particular important factor for the performance of an electric machine is hereby the maximally admissible winding temperature. Exceeding the admissible winding temperature can result in a destruction of the electric machine.

Typically, the temperature has been ascertained heretofore through the provision of temperature sensors that were integrated in a winding end portion or overhang. This approach suffers shortcomings because the thermal linkage of the sensor directly influences the quality of the measuring value, and since the temperature sensor has a predefined mass, it has a thermal time constant that prevents a correlation of the measuring value with the actual temperature value of the winding. Moreover, as the provision of an additional electric insulation of the temperature sensor is required, the time constant is increased, thereby further deteriorating the thermal linkage.

It would be desirable and advantageous to provide an improved electric machine which obviates prior art shortcomings and which is constructed with a temperature monitoring system that is simple in structure and yet reliable in determining an exact and current temperature to thereby allow operation of the electric machine at maximum capacity, even when the electric machine runs in a highly dynamic manner.

SUMMARY OF THE INVENTION

According to one aspect of the present invention, an electric machine includes a heat-generating machine component, and a temperature radiation detector for contactless determination and/or measurement of heat radiating from the machine component for ascertaining an absolute temperature Detection and determination of heat radiation involves the arrangement of a radiation detector, in particular an infrared detector, within the electric machine at a location suitable for detecting radiation of heat-generating components, such as stator, rotor, winding and bearing units. This results in a real-time determination of the temperature of the respective machine components, in particular of the windings. As a consequence, the winding can be protected from overheating, especially when operating the electric machine in a highly dynamic manner. A high-dynamic operation is encountered in particular when machine tools are involved. Thus, the electric machines can be operated in an optimum manner at maximum power.

Thus, present invention advantageously enables a transmission of data or information about rotating components, such as, e.g., a rotor, or of a component which operates under voltage, in a simple manner.

According to another feature of the present invention, there may be provided an evaluation device, positioned on the electric machine or in a control station, for receiving information from the radiation detector at predetermined time instances for establishing a thermographic image of the electric machine. In this way, weak thermal areas of the electric machine can be ascertained and, if need be, eliminated. The evaluation device may be so constructed as to modify an operating parameter of the machine component, e.g. rotation speed of the rotor, in response to the information inputted from the radiation detector, or to modify an operating parameter of an accommodated fan such as the rotation speed of the fan. Thus, suitable cooling systems can be activated, when an excess temperature is encountered.

The provision of radiation detectors has the advantage of an absence of any thermal time constants as a consequence of masses, as conventionally encountered in prior art approaches that use temperature sensors secured, e.g. to the winding overhang. There is no need to provide an electric insulation of the radiation detector. Thus, the time constants of the radiation detectors, such as infrared detectors, are significantly shorter and a precise thermal image of the electric machine can be created, in particular when the electric machine is operated in a highly dynamic manner. As a result, the electric machine can be operated at maximum capacity.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
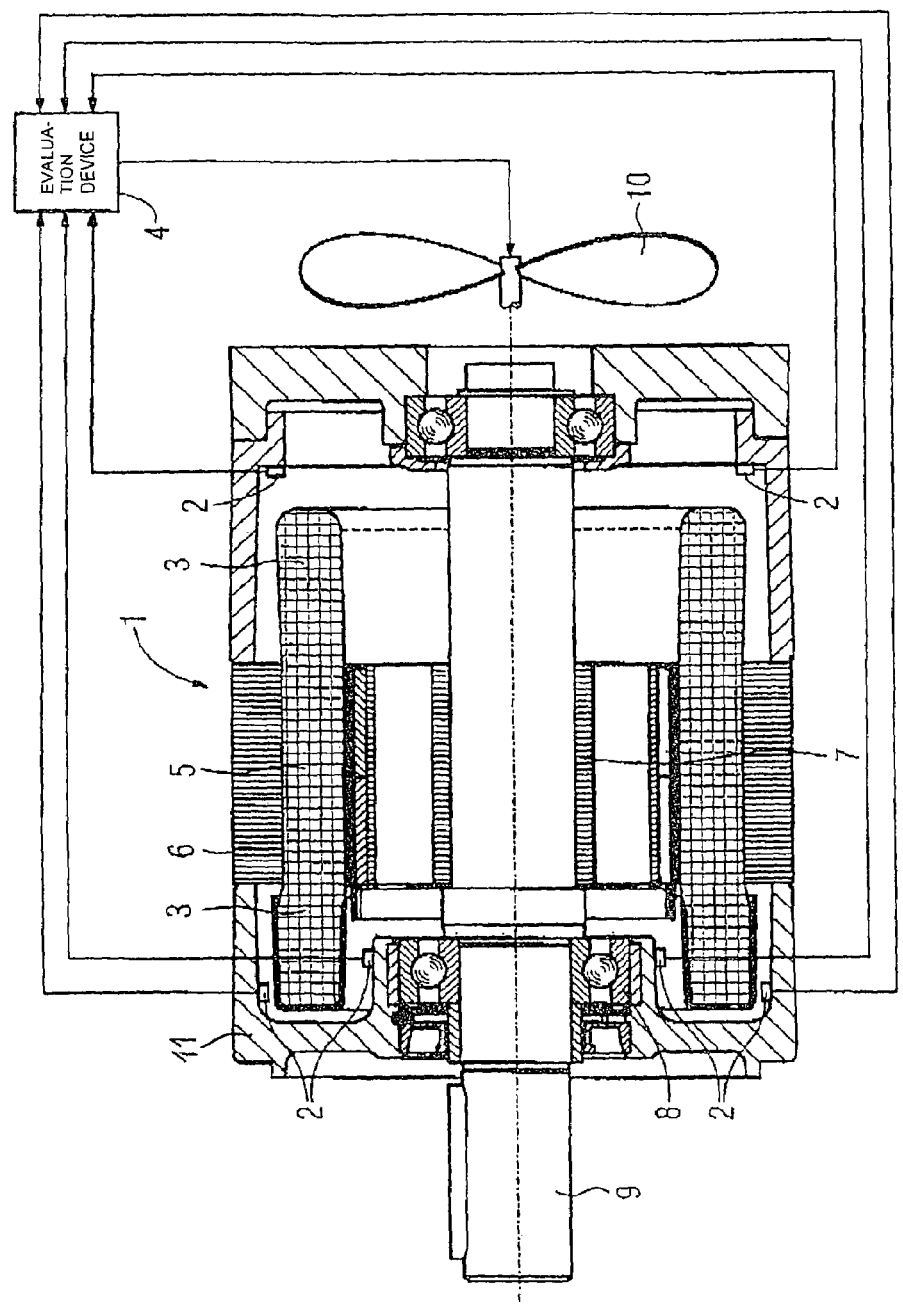
FIG. 1 is a longitudinal section of an electric machine according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 3:
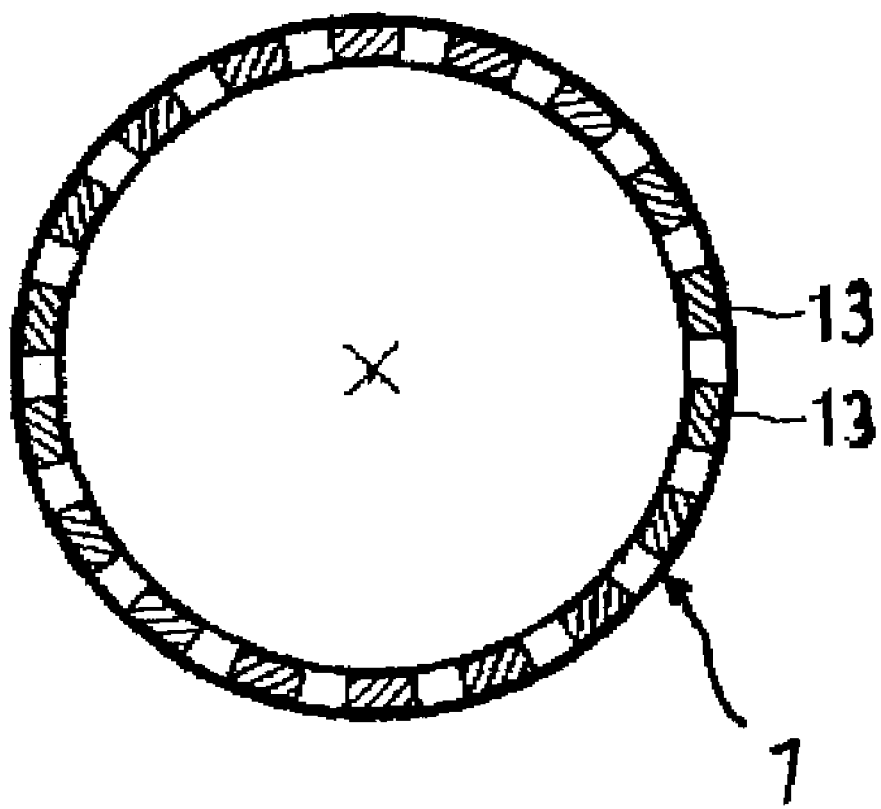
FIG. 3 is an exemplary illustration of a rotor provided with permanent magnets.

Turning now to the drawing, and in particular to FIG. 1, there is shown a longitudinal section of an electric machine according to the present invention, generally designated by reference numeral 1 and having a housing 11 which accommodates a stator 6 having slots (not shown in detail) for receiving a winding 5. The stator 6 is constructed as a stator core formed of a plurality of stacked laminations, with the winding 5 terminating in overhangs 3 at the end surfaces of the stator core. Spaced from the stator 6 is a rotor 7 which is mounted on a shaft 9 and may have permanent magnets 13, shown by way of example in FIG. 3 and which is suitably supported on both sides by bearing assemblies 8. Structure and operation of such an electric machine are generally known to a person skilled in the art so that further description thereof is omitted for the sake of simplicity.

The housing 11 of the electric machine 1 has attached at predetermined locations temperature radiation detectors, such as infrared detectors 2 which are operatively connected to an evaluation device 4. A fan 10 is operatively connected to the evaluation device 4 and activated by the evaluation device 4 in response to information received from the infrared detector 2, when a predetermined temperature threshold of heat-generating machine components, such as winding overhang 3, stator 6, winding 5, rotor 7 and bearing assembly 8, has been exceeded.

Figure 2:
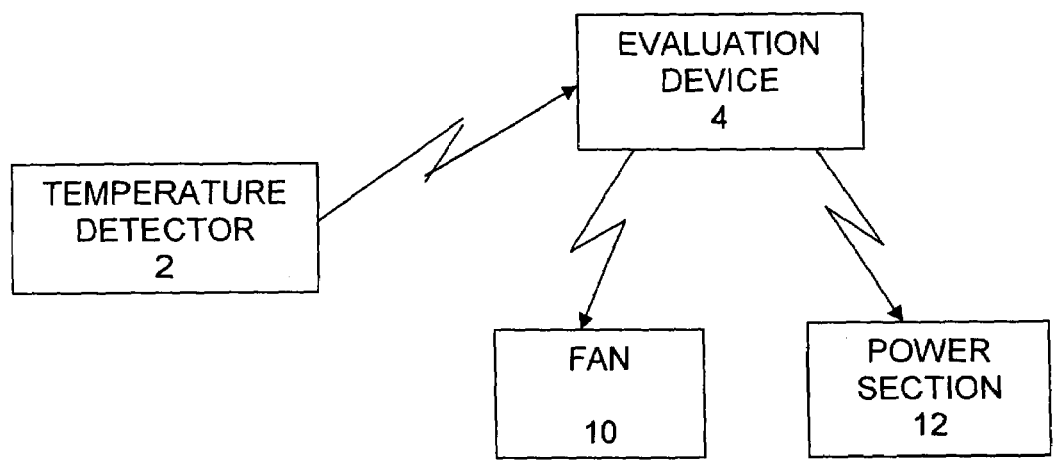
FIG. 2 is a block diagram showing the relationship and operation of components of the electric machine.

As further shown in FIG. 2, the evaluation device 4 may further operatively connected to a power section 12 of the electric machine 1 to thereby modify the rotation speed of a rotating machine component, such as the rotor 7. Thus, the electric machine 1 may, optionally, run at reduced power.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An electric machine, comprising:
  a housing having an interior space;
  a stator supported by the housing and having a winding arranged in the interior space;
  a temperature radiation detector secured to an interior wall of the housing separate and at a distance to the winding for contactless determination and/or measurement of heat radiating from the winding for ascertaining an absolute temperature; and
  an evaluation device receiving information from the temperature radiation detector at predetermined time instances for establishing a thermographic image of the electric machine.

2. The electric machine of claim 1, wherein the radiation detector includes an infrared measuring system.

3. The electric machine of claim 1, further comprising a fan for cooling the winding, said evaluation device controlling operation of the fan in response to the information inputted from the temperature radiation detector.

4. The electric machine of claim 1, wherein the radiation detector is an infrared radiation detector.

5. An electric machine, comprising:
  a housing having an interior space;
  a stator supported by the housing;
  a rotor arranged in the interior space at a spacing to the stator;
  a temperature radiation detector secured to an interior wall of the housing separate and at a distance to the rotor for contactless determination and/or measurement of heat radiating from the rotor for ascertaining an absolute; and
  an evaluation device receiving information from the temperature radiation detector at predetermined time instances for establishing a thermographic image of the electric machine.

6. The electric machine of claim 5, wherein the radiation detector includes an infrared measuring system.

7. The electric machine of claim 5, further comprising a fan for cooling the rotor, said evaluation device controlling operation of the fan in response to the information inputted from the temperature radiation detector.

8. The electric machine of claim 5, wherein the radiation detector is an infrared radiation detector.

9. An electric machine, comprising:
  a housing having an interior space;
  a stator supported by the housing;
  a rotor mounted on a shaft and arranged in the interior space at a spacing to the stator, said rotor having permanent magnets;
  a temperature radiation detector secured to an interior wall of the housing separate and at a distance to the rotor for contactless determination and/or measurement of heat radiating from the permanent magnets for ascertaining an absolute temperature;
  an evaluation device receiving information from the temperature radiation detector at predetermined time instances for establishing a thermographic image of the electric machine.

10. The electric machine of claim 9, wherein the radiation detector includes an infrared measuring system.

11. The electric machine of claim 9, further comprising a fan for cooling the rotor, said evaluation device controlling operation of the fan in response to the information inputted from the temperature radiation detector.

12. The electric machine of claim 9, wherein the radiation detector is an infrared radiation detector.

* * * * *